(12) United States Patent
Blasing et al.

(10) Patent No.: US 6,888,126 B2
(45) Date of Patent: May 3, 2005

(54) CODED DISC FOR AN OPTOELECTRONIC DISPLACEMENT OR ANGLE MEASURING DEVICE

(75) Inventors: Frank Blasing, Werl (DE); Ralph Böbel, Dortmund (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 262 days.

(21) Appl. No.: 10/203,709

(22) PCT Filed: Feb. 14, 2001

(86) PCT No.: PCT/EP01/01642

§ 371 (c)(1), (2), (4) Date: Oct. 15, 2002

(87) PCT Pub. No.: WO01/61280

PCT Pub. Date: Aug. 23, 2001

(65) Prior Publication Data

US 2003/0052262 A1 Mar. 20, 2003

(30) Foreign Application Priority Data

Feb. 15, 2000 (DE) .......................................... 100 06 675

(51) Int. Cl.[7] ................................................ G01D 5/34
(52) U.S. Cl. ............................ 250/231.13; 250/234.14; 250/237 R
(58) Field of Search ....................... 250/231.13, 231.14, 250/231.16, 231.18, 237 R; 356/614, 616, 617, 482; 341/11, 13, 31

(56) References Cited

U.S. PATENT DOCUMENTS

| 4,859,845 A | * | 8/1989 | Sakano | .................. 250/231.13 |
| 5,214,426 A | | 5/1993 | Minohara et al. | |
| 5,734,160 A | * | 3/1998 | Chung et al. | .......... 250/231.13 |

FOREIGN PATENT DOCUMENTS

| DE | 4014479 A1 | 5/1990 |
| DE | 196 04 502 A1 | * 2/1996 |
| EP | 0 263 888 A1 | 4/1987 |
| EP | 0 276 402 A1 | 11/1987 |
| JP | 60089709 | 5/1985 |
| WO | WO 9204600 | 3/1992 |
| WO | WO 9204776 | 3/1992 |

* cited by examiner

Primary Examiner—Stephone B. Allen
(74) Attorney, Agent, or Firm—Brooks Kushman P.C.

(57) ABSTRACT

An optoelectronic position measuring device includes an encoder disk having a coding with a digital code and an analog coded track. The analog track includes segments which are in a series and whose width changes. An illuminator images the coding onto a sensor having transducers. The sensor determines the width of the analog track at a given position of the disk relative to the sensor as a function of the number of transducers upon which the analog track is optically imaged onto. The analog track is part of a continuous reference code track which has central symmetry in which the segments have a code length corresponding to the smallest resolution step of the digital coding. The layout of the segments and the resolving power of the sensor are matched such that movement of the disk along the code length is resolvable into at least two defined steps.

10 Claims, 2 Drawing Sheets

CODED DISC FOR AN OPTOELECTRONIC DISPLACEMENT OR ANGLE MEASURING DEVICE

1. FIELD OF THE INVENTION

The present invention pertains to an optoelectronic position or angular measuring device, comprising a code disk and a photosensitive sensor disposed stationary with respect to said disk, with a plurality of photoelectric transducing elements, which are disposed adjacent to each other in the transverse direction to the longitudinal extension of the coding, and an illuminator for optically imaging the coding on the code disk on the photosensitive surface of the sensor, which code disk comprises a digital code as coding and analog coded track consisting of a plurality of individual code segments which are mounted successively in the direction of the measuring distance.

2. BACKGROUND ART

In many cases, position devices and angular measuring devices are used for automatic positioning and measuring in machine tools and coordinate measuring devices. Rotary angle sensors, for example, are used in motor vehicles for determining the absolute angular position of the steering wheel and therefore also are called steering angle sensors. The steering angle is required in motor vehicles, in order to be able to apply this value, for example, to the system for controlling the dynamics of vehicle movement. Such a system for controlling the dynamics of vehicle movement, in addition to the aforementioned steering angle values, contains other measuring data, for example, the number of rotations of the wheel or the vehicle's rotation around its vertical axis. Both the absolute steering angle and the speed of steering are required, so that these values, together with the other sensed data, can be evaluated by the system for controlling the dynamics of vehicle movement and be converted for controlling the actuators, for example, the brakes and/or the engine management.

An optoelectronic steering angle sensor, for example, is known from DE 40 22 837 A 1. The steering angle sensor described in this document consists of two parallel disposed elements, a light source and a line sensor, as well as a code disk placed between the light source and the line sensor, which disk is fixed to the steering wheel shaft. A CCD sensor line serves as a line sensor. With this code disk, a light slit formed as an archimedean spiral, which extends over 360°, is provided as coding. Lighting of the corresponding transducing elements of the line sensor at a specific steering angle can provide information on the actual steering angle.

Other optoelectric steering angle sensors are known which, instead of the above-described analog coding, comprise a digital coding, for example, a so-called gray code. The resolution of such a digital code is contingent upon the length of the smallest structure. Code disks, the digital coding of which is able to realize a resolution of approx. 0.7°, are produced at a reasonable cost and are used in the motor vehicle segment. As the demands on the steering sensor systems increase, it is necessary to provide a higher resolution capacity. An increase in the resolution capacity by improving the digital code would be feasible, but is too costly, because of the fineness of the necessary structures.

DE 196 04 502 A1 describes an optoelectronic read head for reading digital codings, in which both the light source and an optical sensor are disposed on the same side of a code disk. A gray code serves as a code, as well as an analog track with wedge-shaped signal surfaces. The analog track, which serves to increase the resolution capacity of the device, has a saw-toothed shape and contains irregularities in which a defined signal assignment is not possible. The irregularities are linked by slanted signal surfaces, in which it is provided that only the center section of the slanted signal surfaces is evaluated.

The code length of a code segment of the analog track, which extends from the first irregularity to the next irregularity by extending the analog track, corresponds to the length of the spacing of the digital gray code. However, because only the center section of such an analog code segment is used to avoid an evaluation of the irregularities, the effective code segment length corresponds to the analog track of the signal element length of the gray code. In order to still achieve a continuous readout of the analog signal surfaces with the object of DE 196 04 502 A1, the analog signal surfaces are scanned with two streaks of light. This, however, makes considerable demands on the hardware used therein, such as mirrors, etc., resulting in inaccuracies during the evaluation when switching from one streak of light to another. Consequently, a continuous evaluation of the analog signal surfaces with the coding known from DE 196 04 502 A1 cannot be performed without errors.

From DE 40 14 479 A1 another optoelectric position or angular measuring device is known, whose code disk comprises a digital code as well as an analog track. The analog track is formed of lens-shaped, individual, not interconnected code track segments. The device described in DE 40 14 479 A1 operates like a light barrier, in which a detector is allocated to each digital code track. The analog code track comprises two adjacent detectors. A sensor array, for example, a line sensor, is not provided with the object of this document. Even if the analog code track within a specific angular range is able to achieve a higher resolution by means of the lens-shaped code track segments, an even resolution over the entire extension of the coding is not yielded. The resolution increases in the transitions, if one or both detectors of the analog track are exposed. A change cannot be detected in the longer sections, for example, within a lens-shaped code track segment or between two code track segments.

In addition, a further reference track is located on the code disk, which is light-permeable throughout and which has its sole purpose to take into consideration and to eliminate differences in light during the evaluation with illumination of detectors which are not to be traced to a movement of the code disk.

The problem with this type of optoelectronic position or angular measuring device is the mechanical play of the moveable code disk relative to the fixed detectors, which, above all, with the object of DE 196 04 502 A1 is significant, because of the necessary switchover of the streak of light. The correction of these types of mechanical tolerances is not taken into consideration with any of the cited documents. In the object of document DE 40 14 479 A1, this is not absolutely necessary due to the installed detector photodiodes.

SUMMARY OF THE INVENTION

In view of the aforementioned prior art, the problem of the present invention is to further develop a generic device of the aforementioned type in such a way that the resolution is increased without considerable expenditure and especially is increased constantly over the entire measuring distance, and simultaneously enabling the correction of mechanical tolerances.

In the present invention, this problem is solved in that the analog-coded track is part of a center-to-center symmetry of the continuous reference code track, whose series-mounted code segments define a continuous analog code track, and the code segments comprise a code length which at least corresponds to the lowest resolution step of the digital coding, in which the embodiment of such a code segment and the resolution capacity of the sensor device are so balanced that a movement of the code disk over the minimum length of a code segment can be resolved into at least two defined steps.

Providing an analog-coded track as part of a center-to-center symmetric, continuous reference code track has the advantage that a single track can be used not only for scanning an analog coding, but this reference code track also can be used for determining the pulse center and for considering mechanical tolerances, when evaluating the exposed transducing elements. The analog-coded track is regular and continuous, so that over the overall length of the reference code track, which extends parallel to the digital coding over the entire length, it is ensured that in every position of the code disk toward the transducing elements, for example, the sensor line, an equal resolution can be realized. The analog method of determining the position of the code disk toward the sensor device is required only within the perimeter of the smallest spacing of the digital coding, and can be repeated with corresponding frequency. The analog code track is formed by successive mounting of the individual code segments in the direction of movement of the code disk. The resolution in the area of such an analog code segment also is contingent upon the resolution of the applied sensor, for example, a PDA line. The limitation of the resolution to a very small subsection of the overall distance, which can be sensed, also acts favorably on the necessary width of this track, which consequently hardly increases the width of a normally installed code disk.

The reference code track, which is combined from an analog track and a reference track, has a center-to-center symmetry in which the analog coding, for example, is wave-shaped or structured as a continuous serrated line. With a development as a serrated line, it is expedient to arrange the peak points of the reference code track in the middle of the separation of the two smallest structures of the digital coding to increase the sharpness of separation of the digital coding.

In a preferable development, the length of a code segment of the analog track corresponds to the length of the smallest structure of the digital coding. In principle, the length of an analog code segment, however, may vary from the spacing of the smallest step of the resolution of the digital code to its overall extension.

It may be provided that two similar reference code tracks are provided, between which the digital coding runs. The two reference code tracks then are preferably offset about the spacing of a resolution of the digital code. By this method, the direction of motion of the code disk can easily be determined.

Such a code disk preferably is used as part of a steering angle device of a motor vehicle.

BRIEF DESCRIPTION OF THE DRAWINGS

Further advantages and developments of the invention are an integral component of additional dependent claims and the following description of an embodiment in reference to the attached figures. Of the figures:

DETAILED DESCRIPTION

Figure 1:
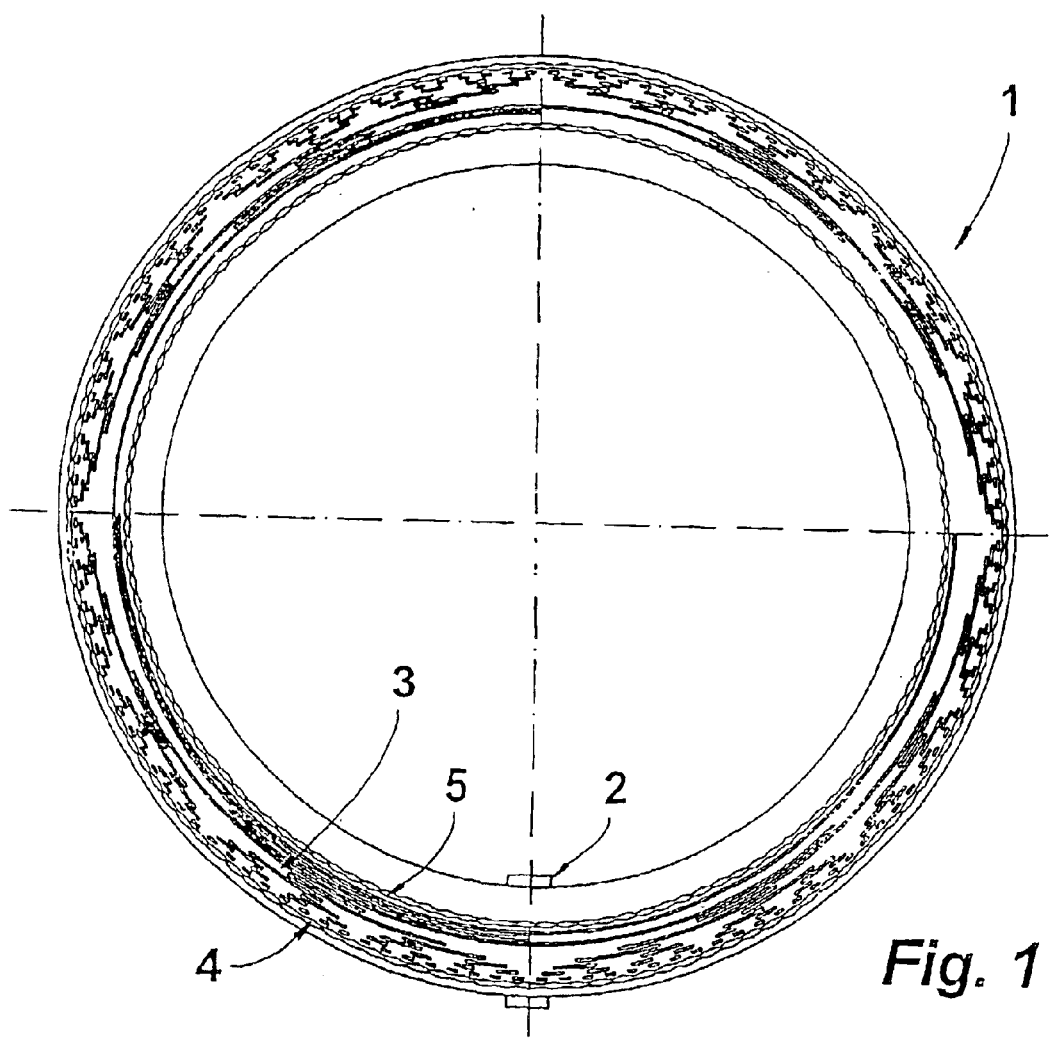
FIG. 1 shows a horizontal projection of a code disk for the steering angle sensor of a motor vehicle.

A code disk 1 for a steering angle sensor of a motor vehicle is constructed as an annular disk and coupled in a manner, which is not shown in detail, to the movement of rotation of the steering wheel shaft. The code disk 1 is illuminated from one side; on the opposite side of the code disk 1, a line sensor, a PDA line 2, is disposed whose photosensitive surface is exposed by the structures contained on the code disk 1.

The code disk 1 carries a gray code 3, consisting of nine tracks with a measuring range of 360°. The resolution capacity of the gray codes 3 is approx. 0.7°. An external reference code track 4 and an internal reference code track 5 are disposed adjacent to the gray code 3. The reference code tracks 4, 5 are coded similarly.

Figure 2:
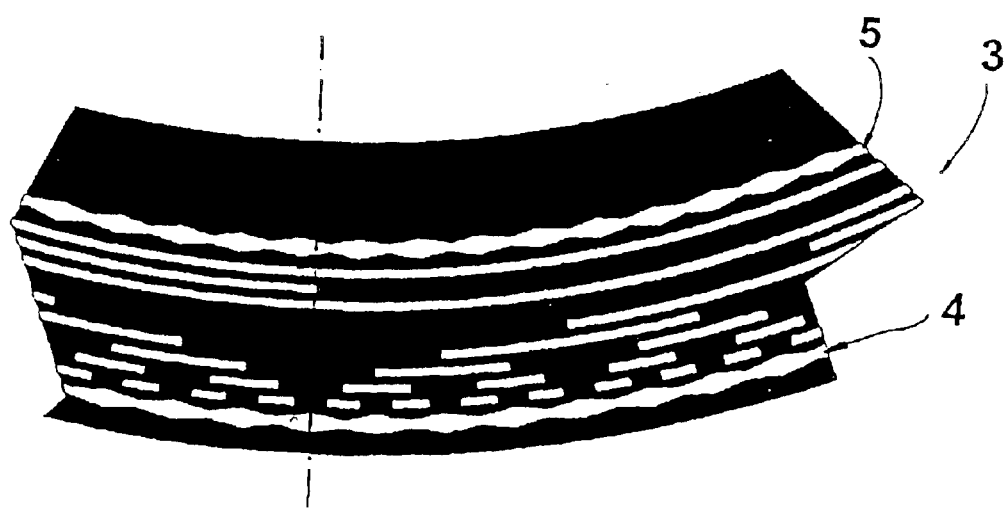
FIG. 2 shows an enlarged section of the code disk of FIG. 1, representing the actual light/dark relationships.

For the sake of providing an overview, the actual blackened areas of the code disk 1 in FIG. 1 are not shown as such. In order to clarify the actual conditions, a section of the code disk 1 of FIG. 1 in its actual condition is shown in FIG. 2. From this presentation, it is clear that only the photosensitive surface of the PDA line 2 is exposed by the individual tracks of the codings 3, 4, 5.

Figure 3A:
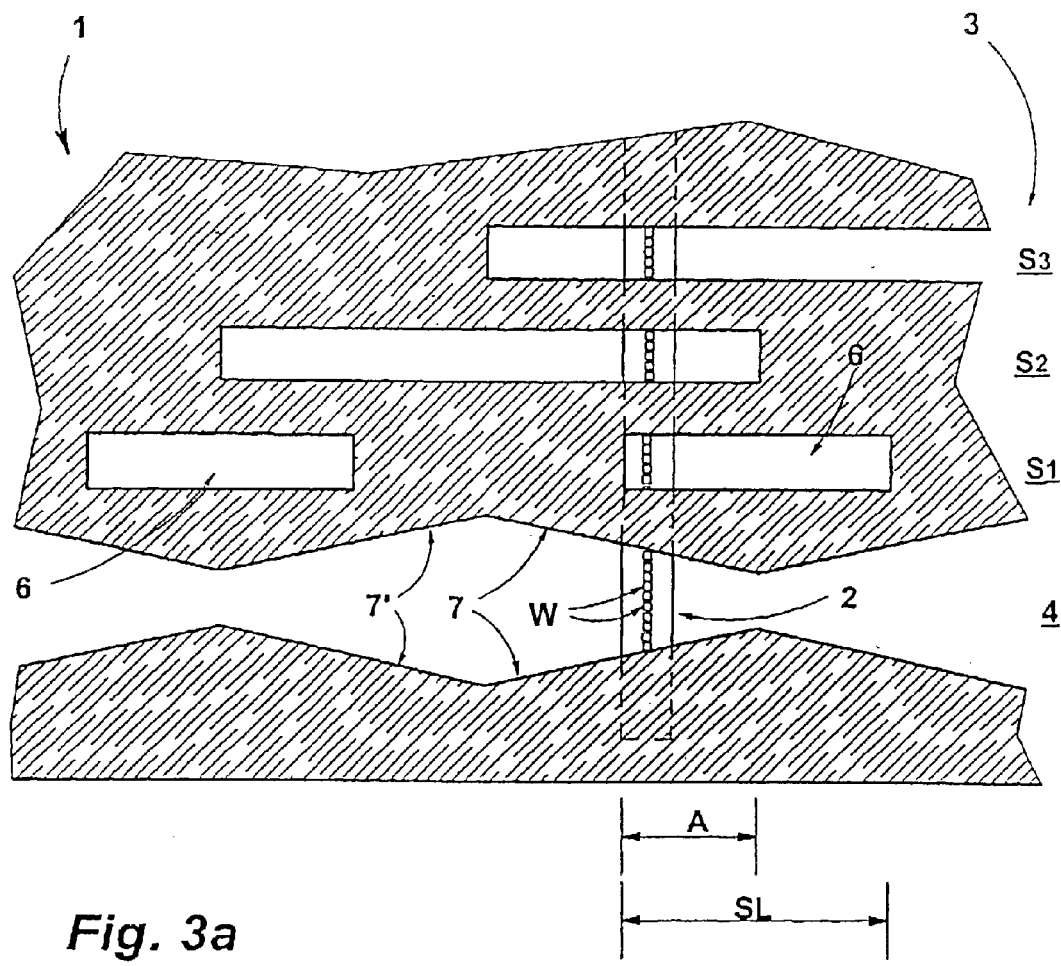
FIG. 3a shows an enlarged section of the code disk of FIG. 1 or 2 in a first position to a line sensor.
Figure 3B:
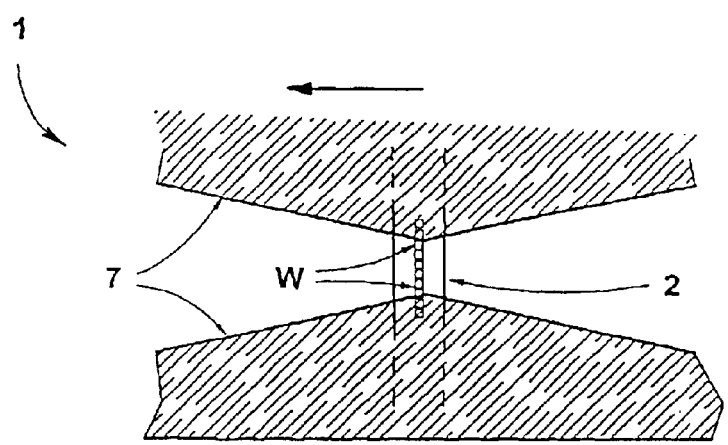
FIG. 3b shows a section of the enlarged presentation of the code disk of FIG. 3a in a second position.

FIG. 3a shows the external three tracks $S_1$, $S_2$, $S_3$ of the gray code 3, as well as the adjacent external reference code track 4, as an explanation of the invention. Below the code disk 1, the PDA line 2 with its individual optoelectronic transducing element W is also shown in a schematic view.

The following describes the reference code track 4; the reference code track 5 is structured correspondingly. The reference code track 4 of the embodiment shown is formed by an overlay of a linear reference track and analog code track. The reference track is required to balance the digital code independent of the position of the code disk 1 to the fixed PDA line 2. This is effected by determining the track center via which the position of the code disk 1 to the PDA line 2 is determined and, ultimately, the positions of additional code tracks of the gray code 3 are determined by the known distance of the individual tracks from one another. For example, this serves to balance the tolerances and, when necessary, a noncentric movement of the code disk 1.

Such an analog code track, overlaying the reference track, serves as a further resolution of the digital steps. In the embodiment shown, the resolution of the gray code is approx. 0.7°. This corresponds to one-half of the width of the smallest digital structure 6. This type of resolution step or its step width is shown in FIG. 3a and denoted as A; the length of the smallest digital structure 6 is denoted as SL. The analog coding in its smallest element consists of a code segment 7 which runs diagonally to the direction of movement of the code disk 1 and whose length corresponds to the length SL of the smallest digital structure. This code segment 7 is formed as a flank which runs diagonally to the direction of movement of the code disk 1. In order to create an analog code track as a continuous code track, said track is formed of alternately diagonally disposed code segments 7, 7', so that a wave-shaped or serrated line is provided as analog code, which extends over 360°. With the embodiment shown, the reference code track 4 extends for 360°, so that the individual code segments 7, 7' do not form a straight line, as simplified in the figures, but are bent corresponding to the radius of the reference code track 4.

The overlay of the aforementioned reference track is provided with the analog code track, which is also described, in that the reference code track 4 has a center-to-center symmetry, so that by means of said reference code track 4, the pulse center can be determined in order to identify the track position.

The resolution capacity of the reference code track 4 in relation to its analog part is contingent upon the gradient of the flank of a code segment 7, 7', as well as on the resolution of the PDA line 2. With the position of the code disk 1 to the PDA line 2, as shown in FIG. 3a, for example, ten transducing elements W are exposed by the reference code track 4. A movement of the code disk 1 in the anticlockwise direction opposite the PDA line 2, for example, after the code disk 1 has been moved by the spacing of one resolution step A, results in only five to six transducing elements W of the reference code track 4 being exposed by the reference code track 4. Correspondingly, within this amount of movement, intermediate steps are definable by evaluating the transducing elements W exposed by the reference code track 4, for example, a step in which eight transducing elements W are exposed. This embodiment shown in the figures merely serves to explain the functionality of the invention; changes in the gradient of the code segment 7, 7' or in the resolution of the line sensor 2 may result in a further increase in resolution.

In the code disk 1, the apex of the analog coding of the reference code track 4 is located in the center between the two smallest structures 6 of the gray code 3, because in this configuration, the selectivity is increased during the readout of the gray code 3.

The internal reference code track 5 is offset by one resolution step A to the reference code track 4, so that by this means, one achieves not only an information redundancy regarding the further local resolution of a resolution step A, but also in that the direction of rotation can be determined by making only a few calculations.

From the description of the invention, it becomes clear that the inventive code disk is able to increase the digital resolution by configuring an additional analog coding by simple means. The use of the combined reference code track in the figures is particularly space-saving, because reference tracks exist in any case, and the additional development of the reference track into a reference code track hardly requires any space in the radial direction, so that the radial width of a conventional code disk is increased only negligibly, compared with the inventive width. As for the object of the current invention, it is possible to make better use of the available sensor surface. This is not irrelevant, above all, in view of the requirements with steering angle sensors in which the installation space in the area of the steering column module is limited.

In addition to the use of a circular code disk, in order to achieve an angular definition, an inventive code disk may also be used for a linear measurement; in this case, the structure of the code is not circular, but straight-lined.

List of Reference Symbols
1 Code disk
2 PDA line
3 Gray code
4 Reference code track
5 Reference code track
6 Smallest structure of the gray code
7, 7' Analog code segment
A Resolution step of the gray code
SL Structure length
W Transducing element

What is claimed is:

1. An optoelectronic position measuring device comprising:
   a movable encoder disk having a coding including a digital code and an analog coded track, the digital code including a plurality of tracks, the analog coded track being continuous without a saltus and defined by a plurality of code segments of non-uniform width arranged in a series one after the other;
   a sensor arranged in a fixed position relative to the encoder disk, the sensor having a plurality of photoelectric transducers arranged next to one another in a direction transverse to the longitudinal extent of the coding of the encoder disk; and
   an illuminator for optically imaging the coding of the encoder disk onto the sensor, wherein the sensor determines the width of the analog coded track at a given position of the encoder disk relative to the sensor as a function of the number of transducers upon which the analog coded track is optically imaged onto at the given position;
   wherein the analog coded track is part of a continuous reference code track which has central symmetry in which the code segments have a code length corresponding to at least (he smallest resolution step of the digital coding, wherein the layout of each code segment and the number of transducers of the sensor, onto which such code segment is imaged, are matched to each other such that a movement of the encoder disk along the code length of a code segment is resolved by the sensor into at least two defined steps.

2. The device of claim 1 wherein:
   the length of each code segment extends over the length of the smallest track of the digital code.

3. The device of claim 1 wherein:
   the code segments include edges arranged at an angle to the direction of movement of the encoder disk.

4. The device of claim 3 wherein:
   the edges of the code segments form a jagged line.

5. The device of claim 4 wherein:
   vertices of the code segments are arranged between the smallest tracks of the digital code.

6. The device of claim 5 wherein:
   the encoder disk includes a second reference code track and the digital code is arranged between the two reference code tracks, with one reference code track being offset with respect to the other reference code track by the width of a resolution step of the digital code.

7. The device of claim 1 wherein:
   the encoder disk is circular and the reference code track correspondingly extends over 360°.

8. The device of claim 7 wherein:
   the code segments are arranged at an angle to the direction of movement of the encoder disk and include edges curved according to the curvature of the continuous reference code track.

9. A vehicle steering angle sensor for determining the rotational angle of a steering wheel, the sensor comprising:
   an encoder disk having a coding including a digital code and an analog coded track, the digital code including a plurality of tracks, the analog coded track being a continuous serrated line void of a saltus and defined by a plurality of code segments of non-uniform width arranged in a series one after the other, the encoder disk connected to the steering wheel to move as the steering wheel rotates;

a sensor arranged in a fixed position relative to the encoder disk, the sensor having a plurality of photo-electric transducers arranged next to one another in a direction transverse to the longitudinal extent of the coding of the encoder disk; and an illuminator for optically imaging the coding of the encoder disk onto the sensor, wherein the sensor determines the width of the analog coded track at a given position of the encoder disk relative to the sensor as a function of the number of transducers upon which the analog coded track is optically imaged onto at the given position;

wherein the analog coded track is part of a continuous reference code track which has central symmetry in which the code segments have a code length corresponding to at least the smallest resolution step of the digital coding, wherein the layout of each code segment and the number of transducers of the sensor, onto which such code segment is imaged, are matched to each other such that a movement of the encoder disk along the code length of a code segment is resolved by the sensor into at least two defined steps.

10. An optoelectronic position measuring device comprising:

a movable encoder disk having a coding including a digital code and an analog coded track, the digital code including a plurality of tracks, the analog coded track having a plurality of alternate diagonally disposed code segments which are arranged in a series one after the other around the encoder disk;

a sensor arranged in a fixed position relative to the encoder disk, the sensor having a plurality of photo-electric transducers arranged next to one another in a direction transverse to the longitudinal extent of the coding of the encoder disk; and an illuminator for optically imaging the coding of the encoder disk onto the sensor, wherein the sensor determines the width of the analog coded track at a given position of the encoder disk relative to the sensor as a function of the number of transducers upon which the analog coded track is optically imaged Onto at the given position.

* * * * *

UNITED STATES PATENT AND TRADEMARK OFFICE
CERTIFICATE OF CORRECTION

PATENT NO. : 6,888,126 B2
DATED : May 3, 2005
INVENTOR(S) : Frank Blasing et al.

It is certified that error appears in the above-identified patent and that said Letters Patent is hereby corrected as shown below:

Column 6,
Line 29, delete "(he" and insert therefor -- the --.

Column 8,
Line 23, delete "Onto" and insert therfor -- onto --.

Signed and Sealed this

Twelfth Day of July, 2005

JON W. DUDAS
*Director of the United States Patent and Trademark Office*